No. 840,065. PATENTED JAN. 1, 1907.
H. JONES.
HYDRAULIC AND PNEUMATIC APPARATUS.
APPLICATION FILED NOV. 27, 1905.
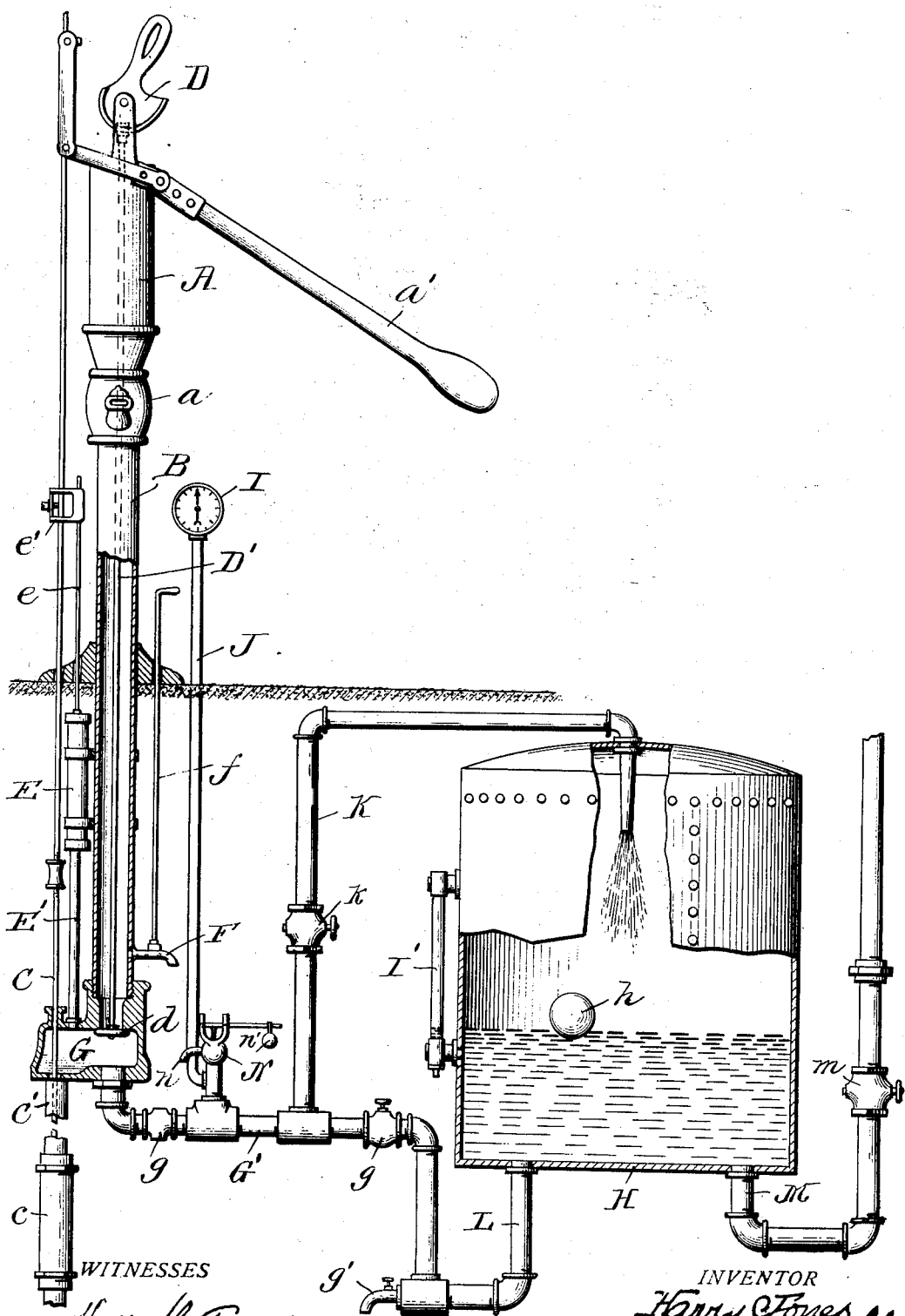

UNITED STATES PATENT OFFICE.

HARRY JONES, OF WASHINGTON, DISTRICT OF COLUMBIA.

HYDRAULIC AND PNEUMATIC APPARATUS.

No. 840,065.     Specification of Letters Patent.     Patented Jan. 1, 1907.

Application filed November 27, 1905. Serial No. 289,341.

*To all whom it may concern:*

Be it known that I, HARRY JONES, a citizen of the United States, residing at Washington, in the District of Columbia, have invented new and useful Improvements in Hydraulic and Pneumatic Apparatus, of which the following is a specification.

My invention relates to a hydraulic and pneumatic apparatus for raising and distributing water, which will be more fully hereinafter described in the specification, illustrated in the drawing, and particularly pointed out in the claims.

The object of my invention is to provide an apparatus for raising water from wells or other storage-places of any depth and discharging and delivering the same at any desired place or places.

Another object of my invention is to combine in one apparatus hydraulic and pneumatic devices and means above and below the earth's surface to effect the desired distribution of water.

A further object of my invention is to provide an apparatus which will be readily understood and easily managed and be strong and durable.

These objects I accomplish by the apparatus shown on the diagrammatic drawing accompanying this application and made a part of it and on which like letters will refer to similar parts.

Referring now to the drawing, A represents the body of a pump; B, a pump-log; a, the water-spout, and a' the handle.

C represents the pump-rod, C' the well-pipe, broken away, and c the pump-cylinder.

D represents an eccentric-headed lever, D' its rod, and d a valve operated thereby.

E represents an air-pump; E', its pipe; e, the rod for operating said air-pump, and e' the clutch for securing said rod by a thumb-screw to the pump-rod C.

F is a faucet, and f the rod by which it is operated.

G is a cross-head, and G' the pipe leading to the water-tank H.

I represents a pressure-gage, and I' a water-gage.

K represents a pipe leading from the pipe G' to the upper part of the tank H for delivering water into said tank to wash and cleanse the same, and k is a stop-valve to regulate the flow of water through the pipe K.

g is a check-valve in the pipe G' to prevent backflow of water from the tank, and g' is a faucet through which the water through pipe L from tank H may be discharged.

h represents a float-valve in the tank H, which will close the mouth of the pipe M when the water is drawn off and prevent the escape of air from tank H.

M represents a conducting-pipe for conducting water from the tank H to any desired point or points, and m is its check-valve.

N represents a relief-valve, and n a relief-cock, and n' a weight.

J is a pipe leading to the pressure-gage I.

Attempts have heretofore been made to secure the results I accomplish, but without success, because of the failure of those making the attempts to comprehend the difficulties to be overcome and to provide means to do the work.

In the apparatus herein described and illustrated I employ the necessary means and mechanism to raise the water and to convey and force it to the desired place.

In operating the apparatus herein described and illustrated I preferably raise the valve d to the position shown in the drawing by turning the eccentric-lever D to the position shown in the drawing. I then secure the rod e by the clutch e' to the pump-rod C, so that both pumps may be in operation at the same time. The valve d being then in the position shown in the drawing and the check-valves in pipe G' being open and the faucet g' and check-valve m being closed, the handle a' of the pump A is then operated and air and water are drawn and forced into the tank H.

The tank H will be constructed to withstand any required pressure. I find from experience that one pound pressure in a tank will raise water in a vertical tube twenty-seven inches. Hence if it is desired to raise water to a height of forty-five feet twenty pounds pressure will be required, and so on in like ratio. In order to at all times know the depth of water in tank H and the pressure therein, the water-gage I' and the pressure-gage I are provided. Having ascertained, therefore, the height to which the water is to be carried, water and air will be pumped into the tank H until the desired pressure is shown on pressure-gage I; when the stop-valve m in pipe M will be opened and the water will be delivered, as described. Care must be taken that the air and water pumps are kept in operation not only to furnish the required amount of air and water, but also to secure and retain the required pressure.

The relief-valve N will be set by its weight n' so as to give relief by discharging water through cock n whenever the pressure in the tank H exceeds the degree expressed by said weight. In case water is not needed in the tank H and is desired for other purposes the valve d may be lowered by turning eccentric-lever D until it closes pipe G', and then the water will be delivered through the spout a'.

I do not limit myself in the size, length, or place any other limitation upon the parts herein described, as I claim the right to use them in any form or size to accomplish the objects herein mentioned.

Having thus fully described my invention, what I claim, and desire to secure by Letters Patent, is—

1. In a machine for pumping and distributing water, the combination with a water-pump and an air-pump, each having a delivery-pipe, and means for operating them simultaneously, of a water and air tank having a supply-pipe for air and water and means for delivering water therefrom under air-pressure, a stand-pipe for delivering water independent of said tank, a valve governing the flow through said stand-pipe, and a hollow distributing cross-head to which the delivery-pipe from the water-pump, the delivery-pipe from the air-pump, the supply-pipe to the water and air tank, and the stand-pipe are all connected, substantially as described.

2. In a machine for pumping and distributing water, the combination with a water-pump and an air-compressor connected to the pump-rod thereof, each having a delivery-pipe and means for operating them simultaneously, of a water and air tank having a supply-pipe for air and water and means for delivering water therefrom under air-pressure, a relief-valve N, a stand-pipe for delivering water independently of said tank, a valve governing the flow through said stand-pipe and a hollow distributing cross-head to which the delivery-pipe from the water-pump, the delivery-pipe from the air-compressor, the supply-pipe to the water and air tank, and the stand-pipe are all connected, and a flushing-pipe K connected to the connecting-pipe G' and tank H, substantially as described.

3. In a machine for pumping and distributing water under pressure, the combination with the water-tank H, of a free floating valve h, a discharge-pipe L, and discharge-pipe M, substantially as described.

In testimony whereof I affix my signature in presence of two subscribing witnesses.

HARRY JONES.

Witnesses:
B. L. CHADWELL,
PARKER H. SWEET, Jr.